(12) United States Patent
Ahn et al.

(10) Patent No.: US 12,553,578 B2
(45) Date of Patent: Feb. 17, 2026

(54) CRYOGENIC LIQUID STORAGE APPARATUS AND LIQUID LEVEL MEASUREMENT DEVICE

(71) Applicants: Hyundai Motor Company, Seoul (KR); Kia Corporation, Seoul (KR)

(72) Inventors: Jun Sung Ahn, Gyeonggi-do (KR); Se Kwon Jung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 228 days.

(21) Appl. No.: 18/421,664

(22) Filed: Jan. 24, 2024

(65) Prior Publication Data
US 2025/0060076 A1 Feb. 20, 2025

(30) Foreign Application Priority Data
Aug. 18, 2023 (KR) .................. 10-2023-0108577

(51) Int. Cl.
*F17C 13/02* (2006.01)
*F17C 3/08* (2006.01)

(52) U.S. Cl.
CPC .............. *F17C 13/026* (2013.01); *F17C 3/08* (2013.01); *F17C 2203/0391* (2013.01); *F17C 2203/0629* (2013.01); *F17C 2221/012* (2013.01); *F17C 2223/0161* (2013.01); *F17C 2250/0417* (2013.01); *F17C 2250/0439* (2013.01); *F17C 2250/0495* (2013.01); *F17C 2270/0184* (2013.01)

(58) Field of Classification Search
CPC ............ F17C 13/026; F17C 2203/0391; F17C 2203/0629; F17C 2250/04; F17C 2250/0404; F17C 2250/0408; F17C 2250/0417; F17C 2250/0439; F17C 2250/0486; F17C 2250/0491; F17C 2250/0495; F17C 2270/0184; G01F 23/00; G01F 23/246; G01F 23/247; G01F 23/248; G01F 23/22; G01F 23/804; G01F 23/266; G01F 23/268; G01F 23/04; G01M 3/002; G01M 3/3236; G01M 3/3245
USPC ........ 73/290 R, 295, 304 R, 292, 32 R, 855, 73/61.58, 61.61
See application file for complete search history.

(56) References Cited

U.S. PATENT DOCUMENTS 4,020,690 A * 5/1977 Samuels ................. G01F 23/16
  73/299
6,658,933 B2 * 12/2003 Allegre ............... G01F 23/2927
  73/290 R (Continued)

FOREIGN PATENT DOCUMENTS

| JP | 2005-134230 A | 5/2005 |
|---|---|---|
| KR | 10-1756181 B1 | 7/2017 |
| KR | 10-2414034 B1 | 6/2022 |

*Primary Examiner* — Frantz F Jules
*Assistant Examiner* — Devon Moore
(74) *Attorney, Agent, or Firm* — Fox Rothschild LLP (57) ABSTRACT

Disclosed is a cryogenic liquid storage apparatus including a storage container configured to accommodate a cryogenic liquid, a housing member provided in the storage container and configured to define a vacuum space spatially separated from an internal space of the storage container, and a temperature sensor provided in the vacuum space so as to be in contact with an inner surface of the housing member and sense a signal to detect a liquid level of the cryogenic liquid.

18 Claims, 9 Drawing Sheets

(56) References Cited

U.S. PATENT DOCUMENTS

| | | |
|---|---|---|
| 7,159,456 B2 | 1/2007 | Pechtold et al. |
| 11,946,594 B2 * | 4/2024 | Varrassi .................... F17C 3/04 |
| 12,152,730 B2 * | 11/2024 | Finne ................... G01K 15/007 |
| 2006/0021431 A1 | 2/2006 | Immel |

* cited by examiner

CRYOGENIC LIQUID STORAGE APPARATUS AND LIQUID LEVEL MEASUREMENT DEVICE

CROSS-REFERENCE TO RELATED APPLICATION

This application claims priority to and the benefit of Korean Patent Application No. 10-2023-0108577 filed in the Korean Intellectual Property Office on Aug. 18, 2023, the entire contents of which are incorporated herein by reference.

BACKGROUND

Technical Field

The present disclosure relates to a cryogenic liquid storage apparatus and a liquid level measurement device, and more particularly, to a cryogenic liquid storage apparatus and a liquid level measurement device, which are capable of accurately detecting the amount of stored cryogenic liquid and improving stability and reliability.

Background

A fuel cell system refers to a system that produces electrical energy by means of a redox reaction between hydrogen and oxygen. Research and development have been consistently performed on the fuel cell system as an alternative capable of solving global environmental issues.

Recently, in order to increase an energy storage density per unit volume of fuel (e.g., hydrogen) used for the fuel cell system, various attempts have been made to store hydrogen in a liquid state (liquid hydrogen) at cryogenic temperatures (e.g., 20 to 33 K) in a storage container and supply the fuel cell stack with the hydrogen (liquid hydrogen or gaseous hydrogen) stored in the storage container.

SUMMARY

The present disclosure has been made in an effort to provide a cryogenic liquid storage apparatus and a liquid level measurement device, which are capable of accurately detecting the amount of stored cryogenic liquid and improving stability and reliability.

In particular, the present disclosure has been made in an effort to accurately measure a liquid level of a cryogenic liquid and accurately and precisely manage (adjust) the amount of vaporized cryogenic liquid stored in a storage container and a pressure in the storage container.

Among other things, the present disclosure has been made in an effort to detect the liquid level of the cryogenic liquid on the basis of a signal sensed by a temperature sensor, prevent the temperature sensor from being exposed directly to the cryogenic liquid, and minimize deformation of and damage to the temperature sensor.

The present disclosure has also been made in an effort to minimize the amount of heat to be transferred to the cryogenic liquid from the outside of the storage container.

In addition, the present disclosure has been made in an effort to ensure durability and safety, minimize a loss of hydrogen (the discharge amount of hydrogen), and maximally delay a time point of a loss of hydrogen (extend a non-loss hydrogen storage period).

The objects to be achieved by the embodiments are not limited to the above-mentioned objects, but also include objects or effects that may be understood from the solutions or embodiments described below.

An exemplary embodiment of the present disclosure provides a cryogenic liquid storage apparatus including: a storage container configured to accommodate a cryogenic liquid; a housing member provided in the storage container and configured to define a vacuum space separated from an internal space of the storage container; and a temperature sensor provided in the vacuum space so as to be in contact with an inner surface of the housing member and configured to sense a signal to detect a liquid level of the cryogenic liquid.

According to the exemplary embodiment of the present disclosure, the storage container may include: an inner container configured to accommodate the cryogenic liquid; an outer container that surrounds the inner container; and a vacuum thermal insulation layer defined between the inner container and the outer container, and the vacuum space may communicate with the vacuum thermal insulation layer.

According to the exemplary embodiment of the present disclosure, the housing member may include: a housing main body; a sealing part that seals one end of the housing main body; and an opening portion provided at the other end of the housing main body, and the opening portion may be connected to an inner port provided in the inner container and that communicates with the vacuum thermal insulation layer.

According to the exemplary embodiment of the present disclosure, the cryogenic liquid storage apparatus may include: a blocking member that blocks a gap between the other end of the housing main body and the inner port.

According to the exemplary embodiment of the present disclosure, the temperature sensor may include: a sensing element provided to be in contact with the inner surface of the housing member and configured to sense a temperature of the cryogenic liquid through the housing member; and a sensor substrate that supports the sensing element.

According to the exemplary embodiment of the present disclosure, the cryogenic liquid storage apparatus may include: a support part that supports the temperature sensor so that the temperature sensor is in close contact with the inner surface of the housing member in the vacuum space.

According to the exemplary embodiment of the present disclosure, the support part may include a spring member that elastically supports the temperature sensor so that the temperature sensor is elastically in close contact with the inner surface of the housing member.

According to the exemplary embodiment of the present disclosure, the support part may include: a guide plate accommodated in the housing member and configured to support the spring member.

According to the exemplary embodiment of the present disclosure, the spring member, together with the temperature sensor, may be supported on the guide plate and accommodated in the housing member.

According to the exemplary embodiment of the present disclosure, the cryogenic liquid storage apparatus may include: an outer port provided in the outer container; a port cover configured to seal the outer port; and a cable feedthrough provided in the port cover so that a cable electrically connected to the temperature sensor passes through the cable feedthrough.

According to the exemplary embodiment of the present disclosure, the cryogenic liquid storage apparatus may include: a heat transfer medium interposed between the temperature sensor and the inner surface of the housing member.

According to the exemplary embodiment of the present disclosure, the temperature sensor may be provided as a plurality of temperature sensors spaced apart from one another in a longitudinal direction of the housing member.

According to the exemplary embodiment of the present disclosure, the housing member may be provided in a gravitational direction.

According to the exemplary embodiment of the present disclosure, the housing member may be provided to be inclined with respect to a gravitational direction.

According to the exemplary embodiment of the present disclosure, the cryogenic liquid storage apparatus may include: a protruding housing part protruding from an outer surface of the housing member, integrated with the housing member, and defining an accommodation space in which the temperature sensor is accommodated.

According to the exemplary embodiment of the present disclosure, the cryogenic liquid storage apparatus may include: a thermally conductive member that surrounds the temperature sensor and provided to be in surface contact with the inner surface of the housing member.

According to the exemplary embodiment of the present disclosure, the cryogenic liquid storage apparatus may include: a first flat contact portion provided on the inner surface of the housing member and provided to be in surface contact with one surface of the thermally conductive member; and a second flat contact portion provided on the inner surface of the housing member and provided to be in surface contact with the other surface of the thermally conductive member.

According to the exemplary embodiment of the present disclosure, the thermally conductive member may have a triangular cross-sectional shape.

Another exemplary embodiment of the present disclosure provides a liquid level measurement device, which is configured to measure a liquid level of a cryogenic liquid accommodated in a storage container, the liquid level measurement device including: a housing member provided in the storage container and configured to define a vacuum space spatially separated from an internal space of the storage container; and a temperature sensor provided in the vacuum space so as to be in contact with an inner surface of the housing member and configured to sense a signal to detect a liquid level of the cryogenic liquid.

According to the exemplary embodiment of the present disclosure, the storage container may include: an inner container configured to accommodate the cryogenic liquid; an outer container that surrounds the inner container; and a vacuum thermal insulation layer defined between the inner container and the outer container and communicating with the vacuum space.

As discussed, the method and system suitably include use of a controller or processer.

In another embodiment, vehicles are provided that comprise an apparatus as disclosed herein.

DETAILED DESCRIPTION

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

With reference to FIGS. 1 to 9, a cryogenic liquid storage apparatus 10 according to the embodiment of the present disclosure may include a storage container 100 configured to accommodate a cryogenic liquid, a housing member 200 provided in the storage container 100 and configured to define a vacuum space 202 spatially separated from an internal space of the storage container 100, and a liquid level detector 300 including a temperature sensor 310 provided in the vacuum space 202 so as to be in contact with an inner surface of the housing member 200, the liquid level detector 300 being configured to detect a liquid level of the cryogenic liquid on the basis of a signal sensed by the temperature sensor 310.

This may be to accurately detect the amount of stored cryogenic liquid (liquid hydrogen) and improve stability and reliability.

That is, in order to efficiently operate a fuel cell stack, it may be necessary to accurately adjust the amount of vaporized cryogenic liquid (liquid hydrogen) stored in the storage container 100 and a pressure in the storage container 100 in response to operating conditions of the fuel cell stack. To this end, it is necessary to accurately detect the amount of stored cryogenic liquid.

However, in the related art, it may be difficult to accurately detect the amount of stored cryogenic liquid stored in the storage container, which causes a problem in that it is difficult to accurately adjust the amount of vaporized cryogenic liquid (liquid hydrogen) stored in the storage container and the pressure in the storage container in response to the operating conditions of the fuel cell stack.

In particular, the cryogenic liquid stored in the storage container may be divided into a liquid (liquid hydrogen) and a gas (gaseous hydrogen) at a critical pressure (about 13 bar) or lower. In case that the phase of the cryogenic liquid is divided into two phases (liquid and gas), the amount of stored cryogenic liquid needs to be detected by measuring the liquid level of the cryogenic liquid. However, because the cryogenic liquid has a cryogenic temperature (e.g., 20 to 33 K), a sensor configured to detect the liquid level of the cryogenic liquid is deformed and damaged when the sensor is exposed directly to the cryogenic liquid, which causes a problem in that it is difficult to accurately detect the liquid level of the cryogenic liquid.

In addition, in order to mount the sensor, which is configured to detect the liquid level of the cryogenic liquid, in the storage container, a cable electrically connected to the sensor needs to pass through the storage container, which may cause a problem in that unnecessary heat is transferred to the cryogenic liquid through the cable.

In particular, when the pressure in the storage container increases as heat is applied to the storage container (the pressure is increased by vaporization of liquid hydrogen), there may be a problem in that the amount of hydrogen discharged from the storage container (the amount of loss of hydrogen) increases and a non-loss hydrogen storage period (dormancy) decreases.

Furthermore, a gap between the cable and a port (or hole) in the storage container through which the cable electrically connected to the sensor passes may need to be sealed by a nonmetallic material such as epoxy. However, the nonmetallic material may be easily damaged by being hardened in a cryogenic environment (at a cryogenic temperature of the cryogenic liquid), which causes a problem of deterioration in thermal insulation and sealability of the storage container.

However, according to the embodiment of the present disclosure, the liquid level of the cryogenic liquid may be detected on the basis of a signal sensed by the temperature sensor 310, and the temperature sensor 310 is provided in the vacuum space 202, which is defined in the housing member 200, and sealed from the cryogenic liquid without being exposed directly to the cryogenic liquid. Therefore, because the temperature sensor 310 is not exposed directly to the cryogenic liquid, it is possible to obtain an advantageous effect of stably ensuring detection stability and accuracy of the water level detector and preventing deformation of and damage to the temperature sensor 310 that may be caused when the temperature sensor 310 is exposed directly to the cryogenic liquid.

In addition, according to the embodiment of the present disclosure, a cable 313, which is electrically connected to the temperature sensor 310, may be disposed along the vacuum space 202 without being exposed directly to the cryogenic liquid. Therefore, it is possible to obtain an advantageous effect of eliminating the use of a sealant (a sealant for sealing the hole through which the cable passes) made of a nonmetallic material and minimizing (blocking) the amount of heat to be transferred to the storage container 100 (the cryogenic liquid) along the cable 313.

Therefore, it may be possible to suppress an unnecessary increase in temperature and excessive vaporization of the cryogenic liquid (liquid hydrogen) due to heat applied (transferred) from the outside of the storage container 100. Therefore, it is possible to obtain an advantageous effect of suppressing an excessive increase in pressure in the storage container 100, minimizing the discharge amount of hydrogen to be discharged from the storage container 100 (the amount of loss of hydrogen to be discarded), and maximally delaying a time point of a loss of hydrogen (extending a non-loss hydrogen storage period).

For reference, the cryogenic liquid storage apparatus 10 according to the embodiment of the present disclosure may be used to store various objects in accordance with required conditions and design specifications. The present disclosure is not restricted or limited by the type and properties of the object.

For example, the cryogenic liquid storage apparatus 10 according to the embodiment of the present disclosure may be used to store fuel (e.g., liquid hydrogen) used for mobility vehicles such as fuel cell electric vehicles (e.g., passenger vehicles or commercial vehicles), ships, and aircraft to which a fuel cell system is applied.

The storage container 100 may be provided to store liquid hydrogen (cryogenic liquid hydrogen) used for the fuel cell stack (not illustrated).

Hereinafter, an example will be described in which the cryogenic liquid storage apparatus 10 includes only the single storage container 100. According to another embodiment of the present disclosure, the cryogenic liquid storage apparatus may include a plurality of storage containers configured to independently store cryogenic liquids.

The storage container 100 may have various structures capable of storing the liquid hydrogen (e.g., at −253° C. based on atmospheric pressure). The present disclosure is not restricted or limited by the type and structure of the storage container 100.

Figure 1:
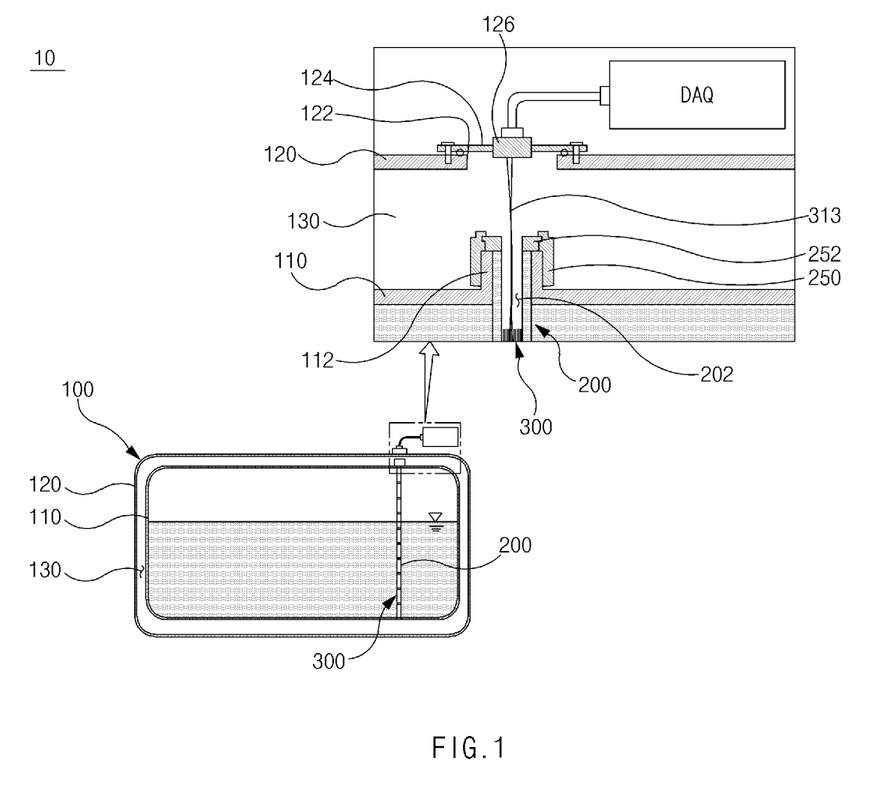
FIG. 1 is a view for explaining a cryogenic liquid storage apparatus according to an exemplary embodiment of the present disclosure.

With reference to FIG. 1, according to the exemplary embodiment of the present disclosure, the storage container 100 may include an inner container 110 having an accommodation space for accommodating the cryogenic liquid (e.g., liquid hydrogen), an outer container 120 configured to surround a periphery of the inner container 110, and a vacuum thermal insulation layer 130 defined between the inner container 110 and the outer container 120.

The inner container 110 and the outer container 120, which constitute the storage container 100, may be variously changed in structure and material in accordance with required conditions and design specifications. The present disclosure is not restricted or limited by the structures and materials of the inner container 110 and the outer container 120.

For example, the inner container 110 may be made of a typical thermally conductive material (e.g., metal) having thermal conductivity. According to another embodiment of the present disclosure, the inner container may be made of a multilayer thin-film thermal insulator (multilayer insulation (MLI)) or other materials.

The vacuum thermal insulation layer 130 for ensuring vacuum thermal insulation (vacuum insulation) may be provided between the inner container 110 and the outer container 120. Therefore, it is possible to obtain an advantageous effect of sufficiently ensuring thermal insulation performance (cryogenic thermal insulation performance) and minimizing evaporation (vaporization) of the liquid hydrogen caused by a heat inflow.

With reference to FIGS. 1 to 3 and 7, the housing member 200 may be provided in the storage container 100 to define the vacuum space 202 spatially separated from the internal space of the storage container. The vacuum space may be completely separated (sealed) from the cryogenic liquid.

Figure 2:
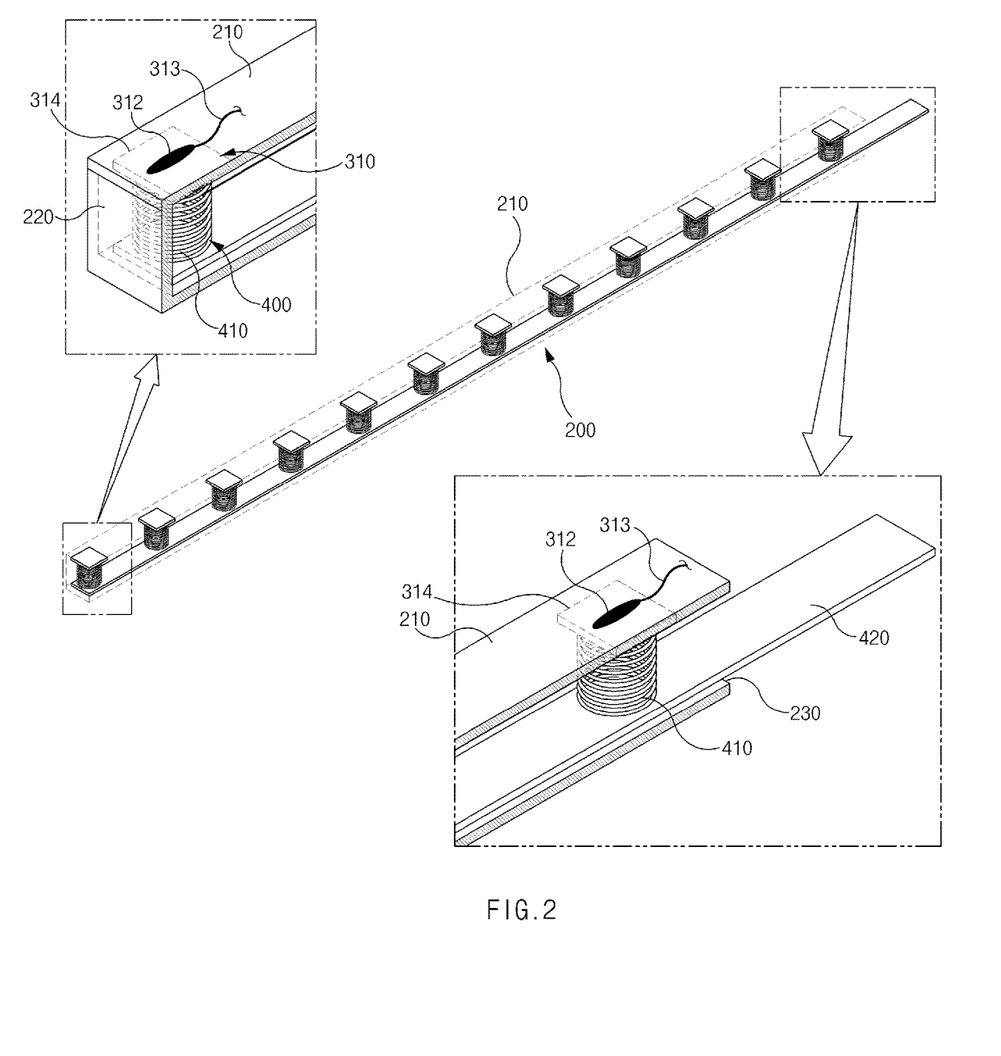
FIG. 2 is a view for explaining a housing member of the cryogenic liquid storage apparatus according to the embodiment of the present disclosure.

The housing member 200 may have various structures having the vacuum space 202. The present disclosure is not restricted or limited by the structure and shape of the housing member 200.

Hereinafter, an example will be described in which the housing member 200 is provided in the form of a straight rod having a length larger than a width thereof. According to another embodiment of the present disclosure, the housing member may have a curved shape or other shapes.

According to the exemplary embodiment of the present disclosure, the vacuum space 202 may be connected to and communicate with the vacuum thermal insulation layer 130.

For example, the housing member 200 may include a housing main body 210, a sealing part 220 configured to seal one end of the housing main body 210, and an opening portion 230 provided at the other end of the housing main body 210. The housing member 200 may be provided in the form of an approximately straight rod opened at one end thereof. The opening portion 230 may be connected to an inner port 112 provided in the inner container 110 and communicate with the vacuum thermal insulation layer 130.

One end (a lower end based on FIG. 1) of the housing main body 210, which is exposed directly to (immersed directly in) the cryogenic liquid, may be completely sealed by the sealing part 220, and the other end (an upper end based on FIG. 1) of the housing main body 210 communicates with the vacuum thermal insulation layer 130, such that the vacuum space 202, which is sealed from the cryogenic liquid, may be defined in the housing main body 210.

The housing member 200 may be made of various materials in accordance with required conditions and design specifications. The present disclosure is not restricted or limited by the material of the housing member 200.

According to the exemplary embodiment of the present disclosure, the housing member 200 may be made of stainless steel (e.g., SUS316L) in consideration of brittleness of the cryogenic liquid (liquid hydrogen).

For reference, the inner port 112 may have various structures capable of penetrating the inner container 110. The present disclosure is not restricted or limited by the structure and shape of the inner port 112.

For example, the inner port 112 may penetrate a wall surface (e.g., an upper wall surface) of the inner container 110 and have an approximately circular cross-section.

The housing member 200 may be disposed in various postures in the storage container 100 in accordance with required conditions and design specifications. The present disclosure is not restricted or limited by the posture and position of the housing member 200.

Hereinafter, an example will be described in which the housing member 200 is disposed vertically in the inner container 110 in the gravitational direction (an upward/downward direction based on FIG. 1).

According to another embodiment of the present disclosure, the housing member 200 may be disposed to be inclined with respect to the gravitational direction. The present disclosure is not restricted or limited by the angle (an inclined angle with respect to the gravitational direction) at which the housing member 200 is disposed with respect to the storage container 100.

According to the exemplary embodiment of the present disclosure, the cryogenic liquid storage apparatus 10 may include a blocking member 250 configured to block a gap between the other end of the housing main body 210 and the inner port 112.

The blocking member 250 is configured to stably maintain (seal) the vacuum state of the vacuum thermal insulation layer 130 and the vacuum space 202 and prevent the cryogenic liquid from being introduced into the vacuum space 202 (the vacuum thermal insulation layer).

The blocking member 250 may be made of various materials and have various structures capable of blocking the gap between the inner port 112 and the other end (the upper end based on FIG. 1) of the housing main body 210. The present disclosure is not restricted or limited by the structure and material of the blocking member 250.

In particular, because the blocking member 250 may be exposed to the cryogenic liquid, the blocking member 250 may be made of a material (e.g., stainless steel), which is not a nonmetallic material, in consideration of brittleness of the cryogenic liquid (liquid hydrogen).

Figure 4:
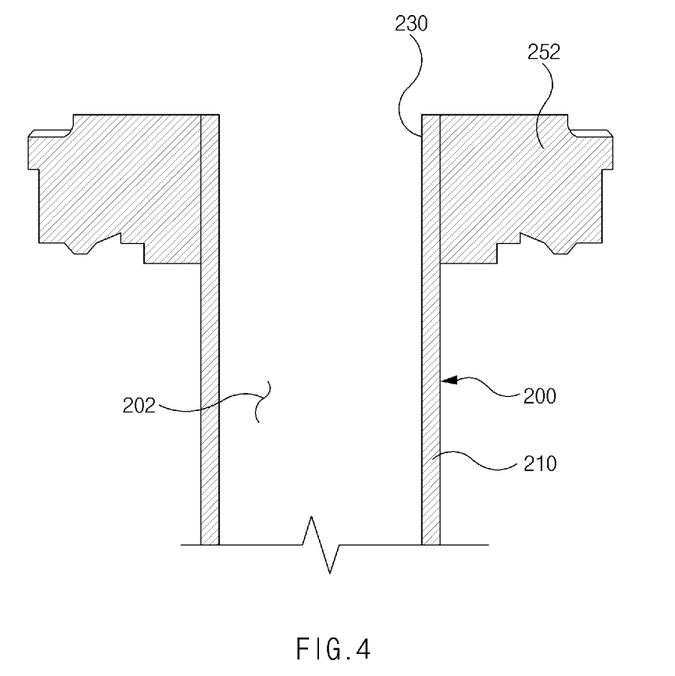
FIG. 4 is a view for explaining a fitting part of the cryogenic liquid storage apparatus according to the embodiment of the present disclosure.

For example, with reference to FIG. 4, a fitting part 252 may be integrally provided at (e.g., fixed, by welding, to) the other end (the upper end based on FIG. 1) of the housing main body 210 and have a larger cross-sectional area than the housing main body 210. The blocking member 250, which has a hollow ring shape, may be coupled to entirely surround a periphery of a gap between the fitting part 252 and the inner port 112 in a state in which the fitting part 252 is placed on an upper end of the inner port 112.

With reference to FIGS. 1 to 3 and 7, the liquid level detector 300 may include the temperature sensor 310 provided in the vacuum space 202 so as to be in contact with the inner surface of the housing member 200. The liquid level detector 300 is configured to detect the liquid level of the cryogenic liquid on the basis of a signal sensed by the temperature sensor 310.

The temperature sensor 310 may be configured to sense a temperature for each position (height) on the housing member 200 in accordance with a change in liquid level of the cryogenic liquid. The temperature sensor 310 may detect the liquid level of the cryogenic liquid on the basis of a signal sensed by the temperature sensor 310.

That is, the cryogenic liquid in the storage container 100 is divided into a liquid (liquid hydrogen) and a gas (gaseous hydrogen). Because the liquid (liquid hydrogen) and the gas (gaseous hydrogen) have different temperatures, it is possible to detect the liquid level of the cryogenic liquid by sensing the temperature for each position (height) on the housing member 200.

According to the exemplary embodiment of the present disclosure, particularly, the temperature sensor 310 may be provided as a plurality of temperature sensors 310 spaced apart from one another at preset intervals in a longitudinal direction of the housing member 200 (in the upward/downward direction based on FIG. 1).

The number of temperature sensors 310 and the spacing interval between the temperature sensors 310 may be variously changed in accordance with required conditions and design specifications. The present disclosure is not restricted or limited by the number of temperature sensors 310 and the spacing interval between the temperature sensors 310.

The temperature sensor 310 may have various structures capable of measuring the temperature of the housing member 200 that may transfer or receive heat to or from the cryogenic liquid. The present disclosure is not restricted or limited by the type and structure of the temperature sensor 310.

Figure 7:
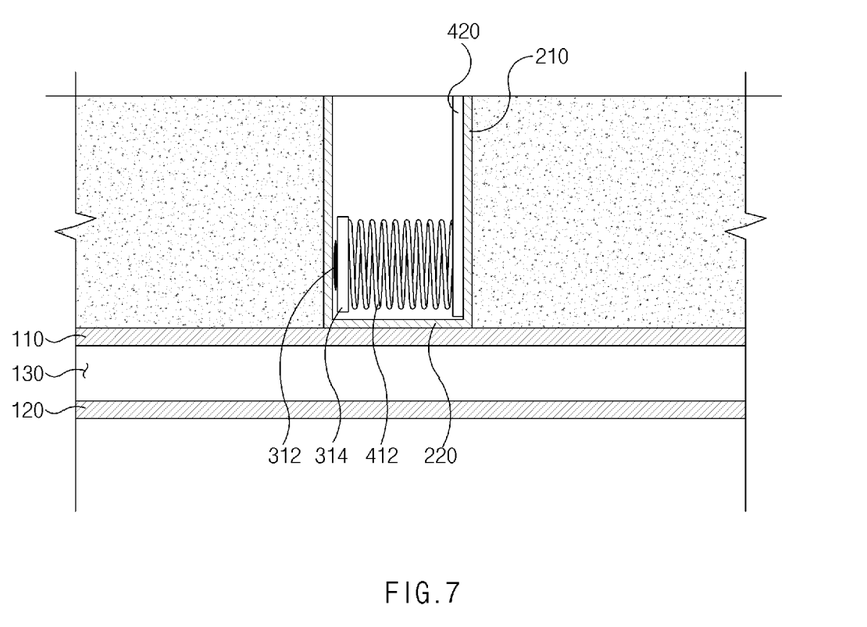
FIG. 7 is a view for explaining a temperature sensor of the cryogenic liquid storage apparatus according to the embodiment of the present disclosure.

According to the exemplary embodiment of the present disclosure, the temperature sensor 310 may include a sensing element 312 provided to be in contact with the inner surface of the housing member 200 and configured to sense the temperature of the cryogenic liquid by means of the housing member 200, and a sensor substrate 314 configured to support the sensing element 312.

Various temperature sensing elements capable of sensing the temperature of the cryogenic liquid by means of the housing member 200 may be used as the sensing element 312. The present disclosure is not restricted or limited by the type and properties of the temperature sensing element.

For example, a silicon diode-based cryogenic sensing element (e.g., DT-670 from Lakeshore) may be used as the sensing element 312 in consideration of accuracy and precision.

The sensor substrate 314 may be configured to support the sensing element 312, and an arrangement state of the sensing element 312 may be stably maintained by the sensor substrate 314.

The sensor substrate 314 may have various structures capable of supporting the sensing element 312. The present disclosure is not restricted or limited by the structure and shape of the sensor substrate 314.

For example, the sensor substrate 314 may be provided in the form of a flat quadrangular substrate. The sensing element 312 may be in contact with the inner surface of the housing member 200 in a state in which the sensing element 312 is mounted on an upper surface of the sensor substrate 314. According to another embodiment of the present disclosure, the sensor substrate may have a circular plate shape or other shapes.

The sensor substrate 314 may be made of various materials in accordance with required conditions and design specifications. The present disclosure is not restricted or limited by the material of the sensor substrate 314.

According to the exemplary embodiment of the present disclosure, the sensor substrate 314 may be made of a material capable of minimizing the effect of thermal conduction on the sensing element 312 (temperature sensing error). For example, the sensor substrate 314 may be made of SUS-based metal or a polymer material such as PTFE that has low thermal conductivity.

Figure 3:
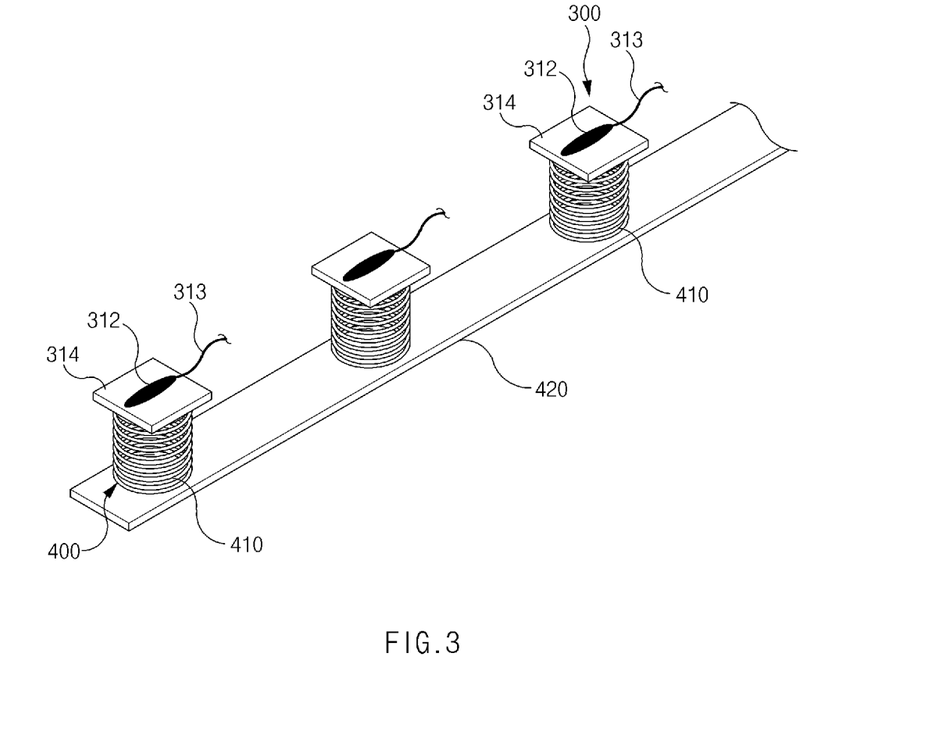
FIG. 3 is a view for explaining a liquid level detector and a support part of the cryogenic liquid storage apparatus according to the embodiment of the present disclosure.

According to the exemplary embodiment of the present disclosure, the cryogenic liquid storage apparatus 10 may include a support part 400 configured to support the temperature sensor 310 so that the temperature sensor 310 is in close contact with the inner surface of the housing member 200 in the vacuum space 202.

The support part 400 may be provided to allow the temperature sensor 310 to be in close contact with the inner surface of the housing member 200, thereby minimizing an increase in thermal contact resistance between the housing member 200 and the temperature sensor 310.

This is based on the fact that when the temperature sensor 310 is not in close contact with the inner surface of the housing member 200 and a gap is created between the temperature sensor 310 and the housing member 200, the thermal contact resistance increases, which degrades sensing accuracy of the temperature sensor 310. According to the embodiment of the present disclosure, because the support part 400 allows the temperature sensor 310 to be in close contact with the inner surface of the housing member 200, it is possible to obtain an advantageous effect of stably ensuring the sensing accuracy of the temperature sensor 310.

The support part 400 may have various structures capable of allowing the temperature sensor 310 to be in close contact with the inner surface of the housing member 200. The present disclosure is not restricted or limited by the structure of the support part 400.

According to the exemplary embodiment of the present disclosure, the support part 400 may include spring members 410 configured to elastically support the temperature sensors 310 so that the temperature sensors 310 are elastically in close contact with the inner surface of the housing member 200.

Various springs may be used as the spring member 410 in accordance with required conditions and design specifications. The present disclosure is not restricted or limited by the type of the spring member 410. For example, a coil spring made of an SUS-based material with low thermal conductivity may be used as the spring member 410.

Meanwhile, the temperature sensor 310 may be attached to the inner surface of the housing member 200 by means of a bonding agent instead of the spring member 410.

However, a typical bonding agent may be hardened and damaged in a cryogenic environment, which causes a problem of an increase in thermal contact resistance. Further, because the interior of the housing member 200 is in a vacuum state (vacuum space), the attachment cannot be sufficiently implemented by the bonding agent. For this reason, in case that a gap is created between the temperature sensor 310 and the housing member 200, the temperature sensor 310 cannot sense the temperature (because heat may be transferred only by conduction in the vacuum space). Therefore, the temperature sensor 310 may be in close contact with the inner surface of the housing member 200 by means of an elastic force applied by the spring member 410.

According to the exemplary embodiment of the present disclosure, the cryogenic liquid storage apparatus 10 may include a guide plate 420 accommodated in the housing member 200 and configured to support the spring member 410.

The guide plate 420 may be configured to stably maintain the arrangement states (arrangement intervals) of the plurality of temperature sensors 310 and the plurality of spring members 410 and allow the plurality of temperature sensors 310 and the plurality of spring members 410 to smoothly enter the housing member 200.

The guide plate 420 may have various structures in accordance with required conditions and design specifications. The present disclosure is not limited or restricted by the structure of the guide plate 420.

For example, the guide plate 420 may be provided in the form of a straight plate having a width corresponding to the housing member 200.

The guide plate 420 may be made of various materials in accordance with required conditions and design specifications. The present disclosure is not restricted or limited by the material of the guide plate 420.

According to the exemplary embodiment of the present disclosure, the guide plate 420 may be made of a material having sufficient structural rigidity and low thermal conductivity. For example, the guide plate 420 may be made of SUS-based metal (e.g., SUS304).

According to the exemplary embodiment of the present disclosure, the spring member 410 may be accommodated in the housing member 200 in a state in which the spring member 410, together with the temperature sensor 310, is supported by the guide plate 420.

Figure 5:
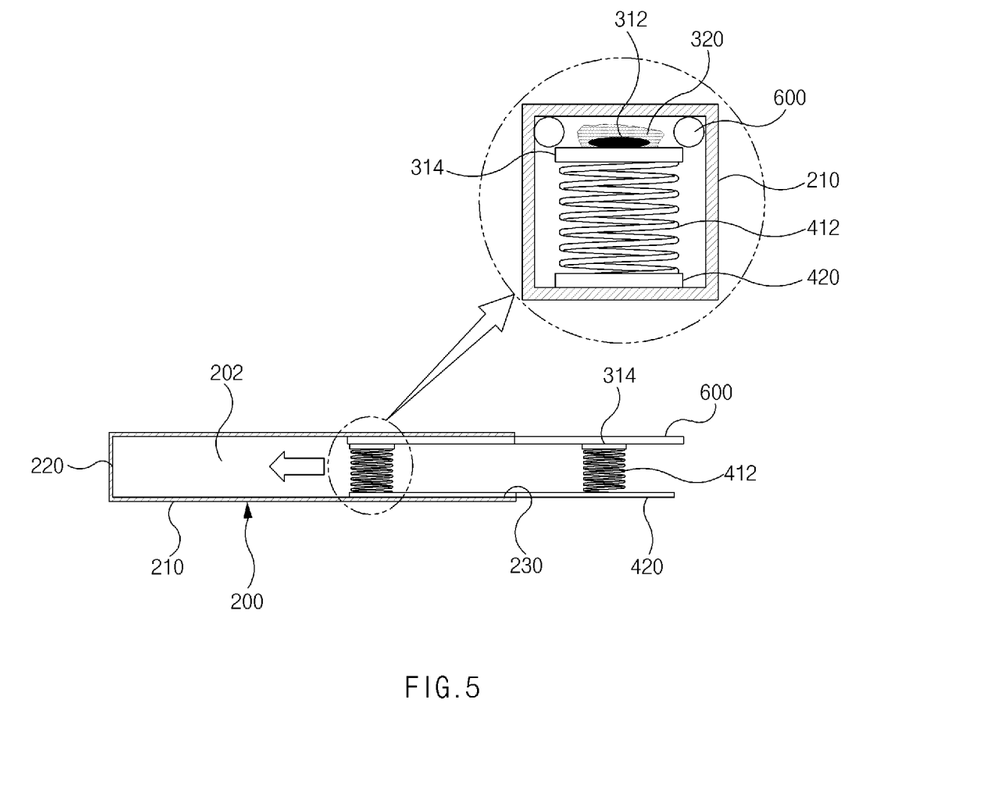
FIGS. 5 and 6 are views for explaining a process of assembling the liquid level detector of the cryogenic liquid storage apparatus according to the embodiment of the present disclosure.

For example, with reference to FIG. 5, the plurality of temperature sensors 310 and the plurality of spring members 410 may be mounted on an upper surface of the guide plate 420, and then the guide plate 420, together with a guide bar 600, may be inserted into the housing member 200 (in a leftward direction based on FIG. 5) in a state in which the spring members 410 are compressed (in a downward direction based on FIG. 5) by the guide bar 600.

Further, a state in which the temperature sensor 310 and the spring member 410 are disposed on the guide plate 420 by means of a bonding agent made of an epoxy-based material may be temporarily maintained. Alternatively, the spring member and the temperature sensor may be disposed on the guide plate without using a separate bonding agent.

Figure 6:
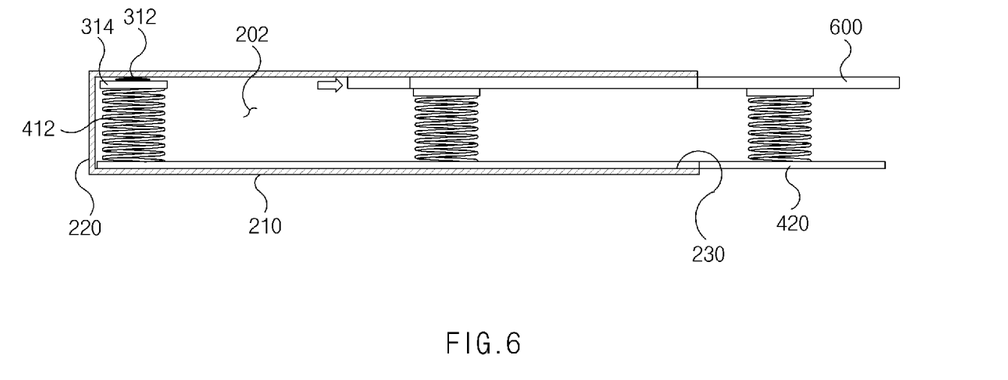

Next, as illustrated in FIG. 6, after the guide plate 420 is completely inserted, the guide bar 600 may be withdrawn to the outside of the housing member 200 (in a rightward direction based on FIG. 6), such that the temperature sensor 310 may be elastically in close contact with the inner surface of the housing member 200 by a restoring force (elastic force) of the spring member 410.

According to the exemplary embodiment of the present disclosure, the cryogenic liquid storage apparatus 10 may include a heat transfer medium 320 interposed between the temperature sensor 310 and the inner surface of the housing member 200.

As described above, according to the embodiment of the present disclosure, the heat transfer medium 320 having high thermal conduction performance may be provided between the temperature sensor 310 and the inner surface of the housing member 200. Therefore, it is possible to obtain an advantageous effect of sufficiently ensuring a thermal contact area between the temperature sensor 310 and the housing member 200 and improving efficiency in transferring heat.

Various media may be used as the heat transfer medium 320 in accordance with required conditions and specifications. The present disclosure is not restricted or limited by the type and properties of the heat transfer medium 320.

For example, cryogenic vacuum grease (e.g., Apiezon-N) may be used as the heat transfer medium 320.

For reference, the heat transfer medium 320 may be applied in advance onto a surface of the temperature sensor 310 before the temperature sensor 310 and the spring member 410, together with the guide plate 420, are inserted into the housing member 200. After the guide plate 420 is completely inserted into the housing member 200, the guide bar 600 is withdrawn to the outside of the housing member 200 (in the rightward direction based on FIG. 6), such that the temperature sensor 310 may be elastically in close contact with the inner surface of the housing member 200 by the restoring force (elastic force) of the spring member 410, and a portion between the temperature sensor 310 and the inner surface of the housing member 200 may be filled with the heat transfer medium 320.

According to the exemplary embodiment of the present disclosure, the cryogenic liquid storage apparatus 10 may include an outer port 122 provided in the outer container 120, a port cover 124 configured to seal the outer port 122, and a cable feedthrough 126 provided in the port cover 124 so that the cable 313 electrically connected to the temperature sensor 310 may pass through the cable feedthrough 126.

The outer port 122 may have various structures capable of penetrating the outer container 120. The present disclosure is not restricted or limited by the structure and shape of the outer port 122.

For example, the outer port 122 may penetrate the wall surface (e.g., the upper wall surface) of the outer container 120 corresponding to the inner port 112 and have an approximately circular cross-section. In particular, the outer port 122 may have a size that allows the housing member 200 to be easily inserted and withdrawn.

The port cover 124 may be fastened to the outer container 120 to seal the outer port 122. The present disclosure is not restricted or limited by the type and structure of the port cover 124. In particular, a sealing member (not illustrated) may be provided in a gap between the outer port 122 and the port cover 124.

The cable feedthrough 126 may be configured to connect the cable 313, which is electrically connected to the temperature sensor 310, to a data acquisition system DAQ or a controller that is provided outside the storage container 100.

Various cable feedthroughs 126 capable of allowing the cable 313 to pass therethrough and maintaining the vacuum state of the vacuum thermal insulation layer 130 (vacuum space) may be used as the cable feedthrough 126. The present disclosure is not restricted or limited by the type and structure of the cable feedthrough 126.

As described above, according to the embodiment of the present disclosure, the cable 313, which is electrically connected to the temperature sensor 310, may pass through the outer container 120 via the vacuum space 202 and the vacuum thermal insulation layer 130 without being exposed directly to the cryogenic liquid, such that a separate hole or port through which the cable 313 passes need not be provided in the inner container 110. Therefore, it is possible to obtain an advantageous effect of stably maintaining thermal insulation and sealability of the inner container 110.

In addition, according to the embodiment of the present disclosure, because a separate hole or port through which the cable 313 passes need not be provided in the inner container 110, it may be possible to eliminate the use of a nonmetallic sealing material (nonmetallic sealing material vulnerable to a cryogenic environment) for sealing the hole or port.

Figure 8:
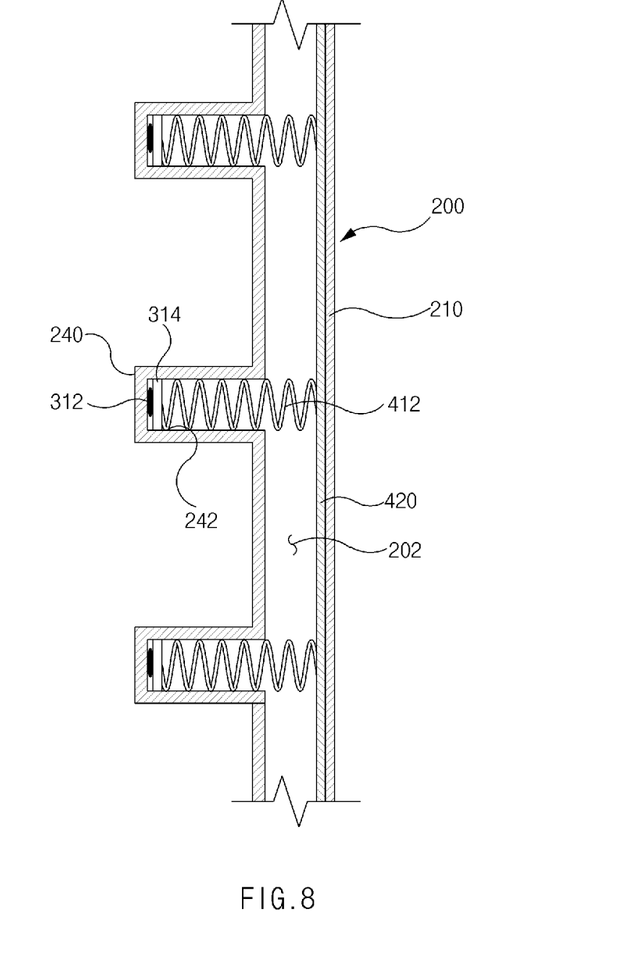
FIG. 8 is a view for explaining a protruding housing part of the cryogenic liquid storage apparatus according to the embodiment of the present disclosure.

With reference to FIG. 8, according to the exemplary embodiment of the present disclosure, the cryogenic liquid storage apparatus 10 may include protruding housing parts 240 protruding from an outer surface of the housing member 200, integrated with the housing member 200, and configured to define accommodation spaces 242 in which the temperature sensors 310 are accommodated.

The protruding housing part 240 may be integrated with the housing member 200 and define the accommodation space 242 in which the temperature sensor 310 and the spring member 410 are accommodated.

The protruding housing part 240 may have various structures capable of defining the accommodation space 242. The present disclosure is not restricted or limited by the structure and shape of the protruding housing part 240.

For example, the protruding housing part 240 may be provided in the form of an approximately quadrangular box. In particular, the protruding housing part 240 may have a cross-sectional area corresponding to the temperature sensor 310.

The protruding housing part 240 may be manufactured in various ways in accordance with required conditions and design specifications. The present disclosure is not restricted or limited by the method of manufacturing the protruding housing part 240.

For example, the protruding housing part 240 may be integrated with the housing member 200 by partially processing (e.g., pressing) a part of the housing member 200. According to another embodiment of the present disclosure, the protruding housing part may be manufactured separately from the housing member and then integrally connected to the housing member.

As described above, according to the embodiment of the present disclosure, the plurality of protruding housing parts 240 may be provided on the housing member 200, and the temperature sensors 310 and the spring members 410 may be accommodated in the accommodation spaces 242 defined in the protruding housing parts 240. Therefore, it is possible to obtain an advantageous effect of more stably maintaining the arrangement states of the temperature sensors 310 and the spring members 410.

In addition, the plurality of temperature sensors 310 may be accommodated in the accommodation spaces 242 of the different protruding housing parts 240, such that a thermal conduction route between the adjacent temperature sensors 310 may be further lengthened. Therefore, it is possible to obtain an advantageous effect of minimizing the effect of the thermal conduction on the adjacent temperature sensors 310 (temperature sensing error) and further improving sensing stability and reliability of the temperature sensor 310.

Meanwhile, in the embodiment of the present disclosure illustrated and described above, the example has been described in which the temperature sensor 310 is in direct contact with the inner surface of the housing member 200. However, according to another embodiment of the present disclosure, the temperature sensor may be in surface contact with the inner surface of the housing member by means of a thermally conductive member.

Figure 9:
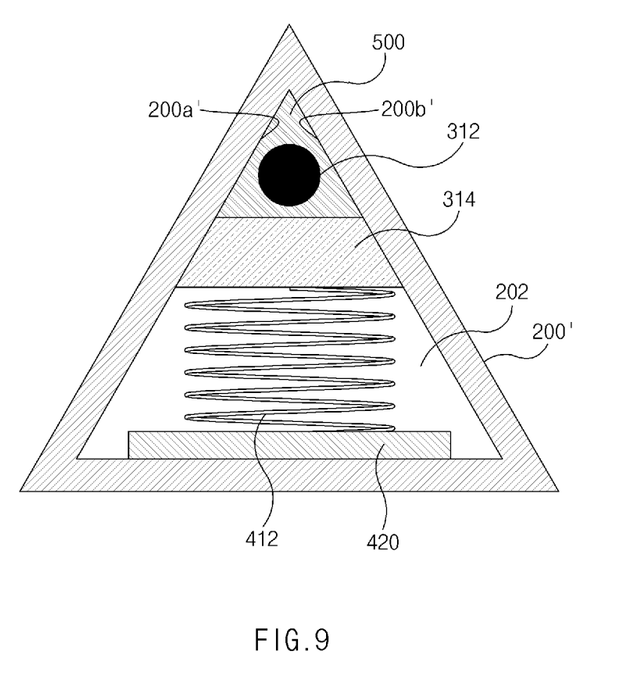
FIG. 9 is a view for explaining a thermally conductive member of the cryogenic liquid storage apparatus according to the embodiment of the present disclosure.

With reference to FIG. 9, according to the exemplary embodiment of the present disclosure, the cryogenic liquid storage apparatus 10 may include a thermally conductive member 500 configured to surround a periphery of the temperature sensor 310 and provided to be in surface contact with the inner surface of the housing member 200.

The thermally conductive member 500 may be made of a typical thermally conductive material (e.g., copper) with thermal conductivity. The present disclosure is not restricted or limited by the material of the thermally conductive member 500.

The thermally conductive member 500 may have various structures capable of being in surface contact with an inner surface of a housing member 200'. The present disclosure is not restricted or limited by the structure of the thermally conductive member 500.

For example, the thermally conductive member 500 may have a triangular cross-sectional shape. According to another embodiment of the present disclosure, the thermally conductive member may have a quadrangular cross-sectional shape or other cross-sectional shapes.

As described above, according to the embodiment of the present disclosure, the temperature sensor 310 may be in surface contact with the housing member 200' by means of the thermally conductive member 500 configured to surround the periphery of the temperature sensor 310, such that the mutual contact area between the temperature sensor 310 and the housing member 200' may further increase. Therefore, it is possible to obtain an advantageous effect of further improving the sensing accuracy of the temperature sensor 310.

With reference to FIG. 9, according to the exemplary embodiment of the present disclosure, the cryogenic liquid storage apparatus 10 may include a first flat contact portion 200a' provided on the inner surface of the housing member 200' and provided to be in surface contact with one surface of the thermally conductive member 500, and a second flat contact portion 200b' provided on the inner surface of the housing member 200' and provided to be in surface contact with the other surface of the thermally conductive member 500.

The housing member 200' may have various structures having the first flat contact portion 200a' and the second flat contact portion 200b'.

According to the exemplary embodiment of the present disclosure, the housing member 200' may be provided in the form of a straight rod having a triangular cross-sectional shape. The first flat contact portion 200a' may be defined at one side of the inner surface of the housing member 200', and the second flat contact portion 200b' may be defined at the other side of the inner surface of the housing member 200'.

Hereinafter, an example will be described in which the first flat contact portion 200a' and the second flat contact portion 200b' collectively define an approximately "V" shape.

As described above, according to the embodiment of the present disclosure, the thermally conductive member 500 may be in surface contact with the first flat contact portion 200a' and the second flat contact portion 200b', such that the mutual contact area between the temperature sensor 310 and the housing member 200' may be more sufficiently ensured. Therefore, it is possible to obtain an advantageous effect of further improving the sensing accuracy of the temperature sensor 310.

In the embodiment of the present disclosure illustrated and described above, the example has been described in which the housing member 200 includes the two flat contact portions. However, according to another embodiment of the present disclosure, the housing member may include three or more flat contact portions.

As described above, according to the embodiment of the present disclosure, it is possible to obtain an advantageous effect of accurately detecting the amount of stored cryogenic liquid and improving the stability and reliability.

In particular, according to the present disclosure, it is possible to obtain an advantageous effect of accurately measuring the liquid level of the cryogenic liquid and accurately and precisely managing (adjusting) the amount of vaporized cryogenic liquid stored in the storage container and the pressure in the storage container.

Among other things, according to the embodiment of the present disclosure, it is possible to obtain an advantageous effect of detecting the liquid level of the cryogenic liquid on the basis of the signal sensed by the temperature sensor, preventing the temperature sensor from being exposed directly to the cryogenic liquid, and minimizing deformation of and damage to the temperature sensor.

In addition, according to the embodiment of the present disclosure, it is possible to obtain an advantageous effect of minimizing the amount of heat to be transferred to the cryogenic liquid from the outside of the storage container.

In addition, according to the embodiment of the present disclosure, it is possible to obtain an advantageous effect of ensuring durability and safety, minimizing a loss of hydrogen (the discharge amount of hydrogen), and maximally delaying a time point of a loss of hydrogen (extending a non-loss hydrogen storage period).

In addition, according to the embodiment of the present disclosure, it is possible to obtain an advantageous effect of suppressing an excessive increase in pressure (expansion) of the storage container and improving safety and reliability.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A cryogenic liquid storage apparatus including:
   a storage container configured to accommodate a cryogenic liquid;
   a housing member provided in the storage container and configured to define a vacuum space separated from an internal space of the storage container; and
   a temperature sensor provided in the vacuum space so as to be in contact with an inner surface of the housing member and configured to sense a signal to detect a liquid level of the cryogenic liquid,
   wherein the storage container comprises:
   an inner container configured to accommodate the cryogenic liquid;
   an outer container that surrounds the inner container; and
   a vacuum thermal insulation layer defined between the inner container and the outer container, and
   wherein the vacuum space communicates with the vacuum thermal insulation layer.

2. The cryogenic liquid storage apparatus of claim 1, wherein the housing member comprises:
   a housing main body;
   a sealing part that seals one end of the housing main body; and
   an opening portion provided at another end of the housing main body, and
   wherein the opening portion is connected to an inner port provided in the inner container and communicates with the vacuum thermal insulation layer.

3. The cryogenic liquid storage apparatus of claim 1, wherein the temperature sensor comprises:
   a sensing element provided to be in contact with the inner surface of the housing member and configured to sense a temperature of the cryogenic liquid through the housing member; and
   a sensor substrate that supports the sensing element.

4. The cryogenic liquid storage apparatus of claim 1, further comprising:
a support part that supports the temperature sensor so that the temperature sensor is in close contact with the inner surface of the housing member in the vacuum space.

5. The cryogenic liquid storage apparatus of claim 1, further comprising:
an outer port provided in the outer container;
a port cover configured to seal the outer port; and
a cable feedthrough provided in the port cover so that a cable electrically connected to the temperature sensor passes through the cable feedthrough.

6. The cryogenic liquid storage apparatus of claim 1, further comprising:
a heat transfer medium interposed between the temperature sensor and the inner surface of the housing member.

7. The cryogenic liquid storage apparatus of claim 1, wherein the temperature sensor is provided as a plurality of temperature sensors spaced apart from one another in a longitudinal direction of the housing member.

8. The cryogenic liquid storage apparatus of claim 1, wherein the housing member is provided in a gravitational direction.

9. The cryogenic liquid storage apparatus of claim 1, wherein the housing member is provided to be inclined with respect to a gravitational direction.

10. The cryogenic liquid storage apparatus of claim 1, further comprising:
a protruding housing part protruding from an outer surface of the housing member, integrated with the housing member, and defining an accommodation space in which the temperature sensor is accommodated.

11. The cryogenic liquid storage apparatus of claim 1, further comprising:
a thermally conductive member that surrounds the temperature sensor and provided to be in surface contact with the inner surface of the housing member.

12. The cryogenic liquid storage apparatus of claim 2, further comprising:
a blocking member that blocks a gap between the other end of the housing main body and the inner port.

13. The cryogenic liquid storage apparatus of claim 4, wherein the support part comprises a spring member that elastically supports the temperature sensor so that the temperature sensor is elastically in close contact with the inner surface of the housing member.

14. The cryogenic liquid storage apparatus of claim 13, wherein the support part further comprises a guide plate accommodated in the housing member and that supports the spring member.

15. The cryogenic liquid storage apparatus of claim 14, wherein the spring member, together with the temperature sensor, is supported on the guide plate and accommodated in the housing member.

16. The cryogenic liquid storage apparatus of claim 11, further comprising:
a first flat contact portion provided on the inner surface of the housing member and provided to be in surface contact with one surface of the thermally conductive member; and
a second flat contact portion provided on the inner surface of the housing member and provided to be in surface contact with another surface of the thermally conductive member.

17. The cryogenic liquid storage apparatus of claim 11, wherein the thermally conductive member has a triangular cross-sectional shape.

18. A liquid level measurement device for measuring a liquid level of a cryogenic liquid accommodated in a storage container, the liquid level measurement device comprising:
a housing member provided in the storage container and configured to define a vacuum space separated from an internal space of the storage container; and
a temperature sensor provided in the vacuum space so as to be in contact with an inner surface of the housing member and configured to sense a signal to detect a liquid level of the cryogenic liquid,
wherein the storage container comprises:
an inner container configured to accommodate the cryogenic liquid;
an outer container that surrounds the inner container; and
a vacuum thermal insulation layer defined between the inner container and the outer container and communicating with the vacuum space.

* * * * *